A. B. HAZARD.
TESTING PROCESS AND MACHINE.
APPLICATION FILED SEPT. 1, 1915.

1,254,690.

Patented Jan. 29, 1918.
9 SHEETS—SHEET 1.

Inventor
Allen B. Hazard.

by George Bayard Jones.
Atty

A. B. HAZARD.
TESTING PROCESS AND MACHINE.
APPLICATION FILED SEPT. 1, 1915.

1,254,690.

Patented Jan. 29, 1918.
9 SHEETS—SHEET 3.

Inventor
Allen B. Hazard,
by George Bayard Jones
Atty

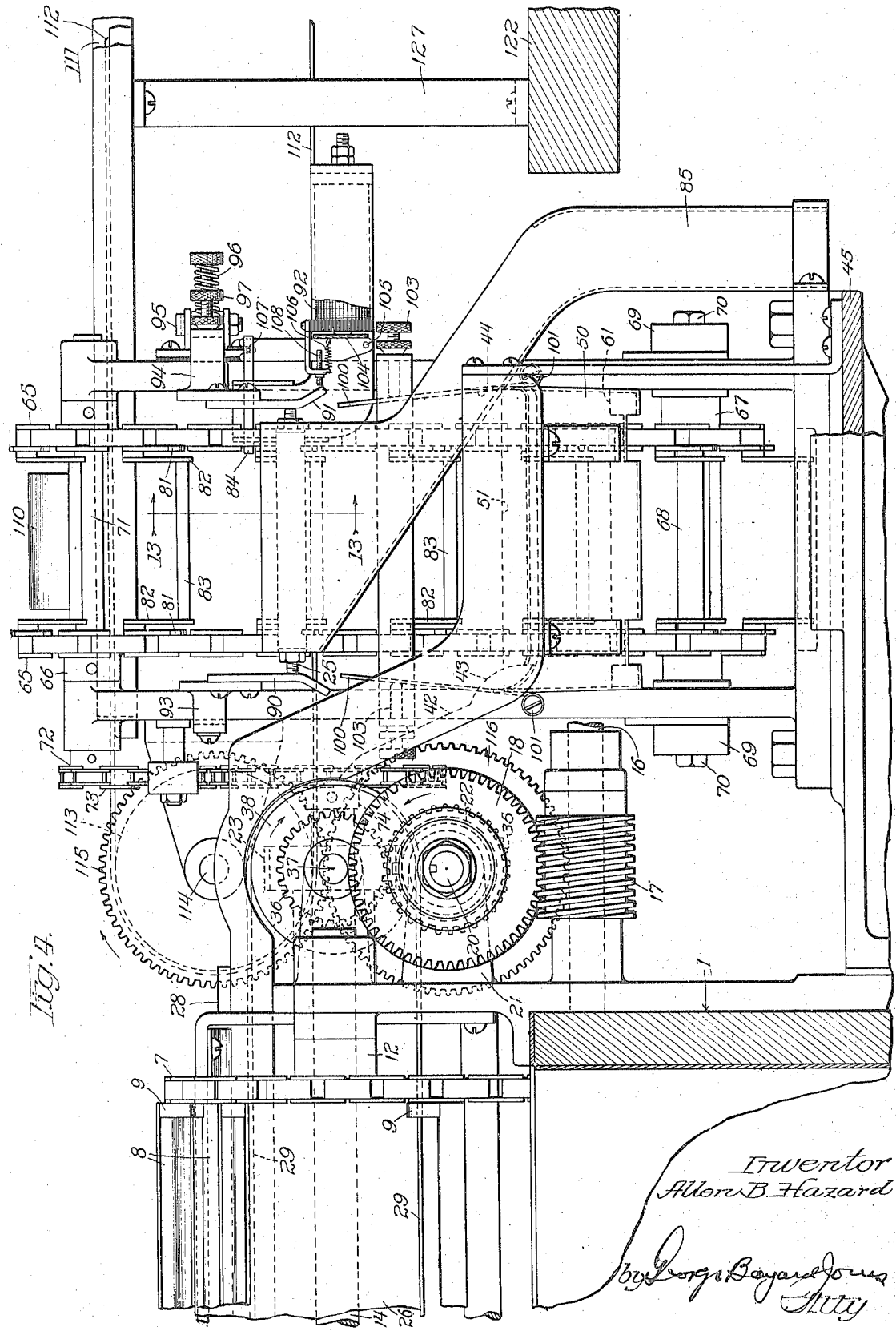

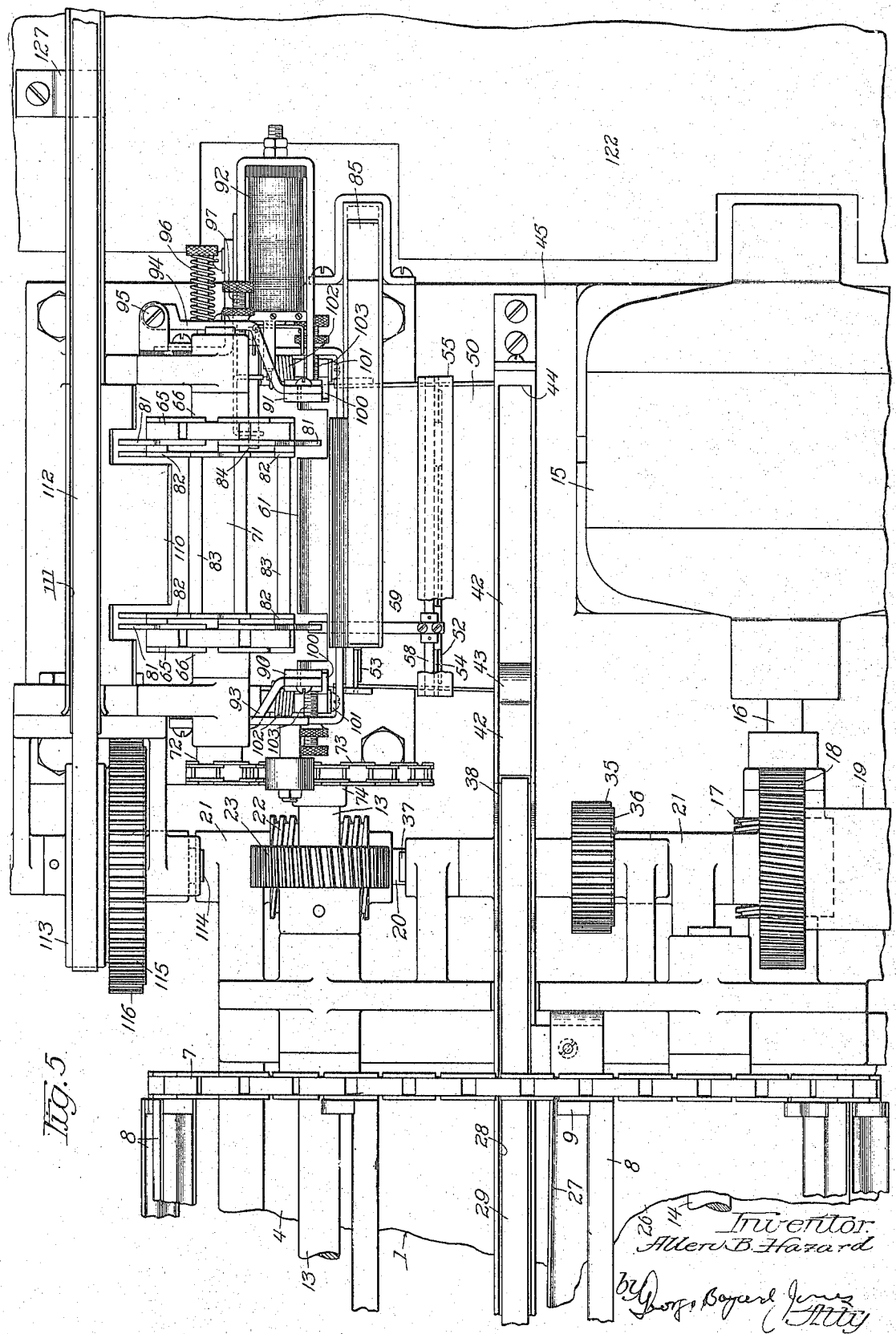

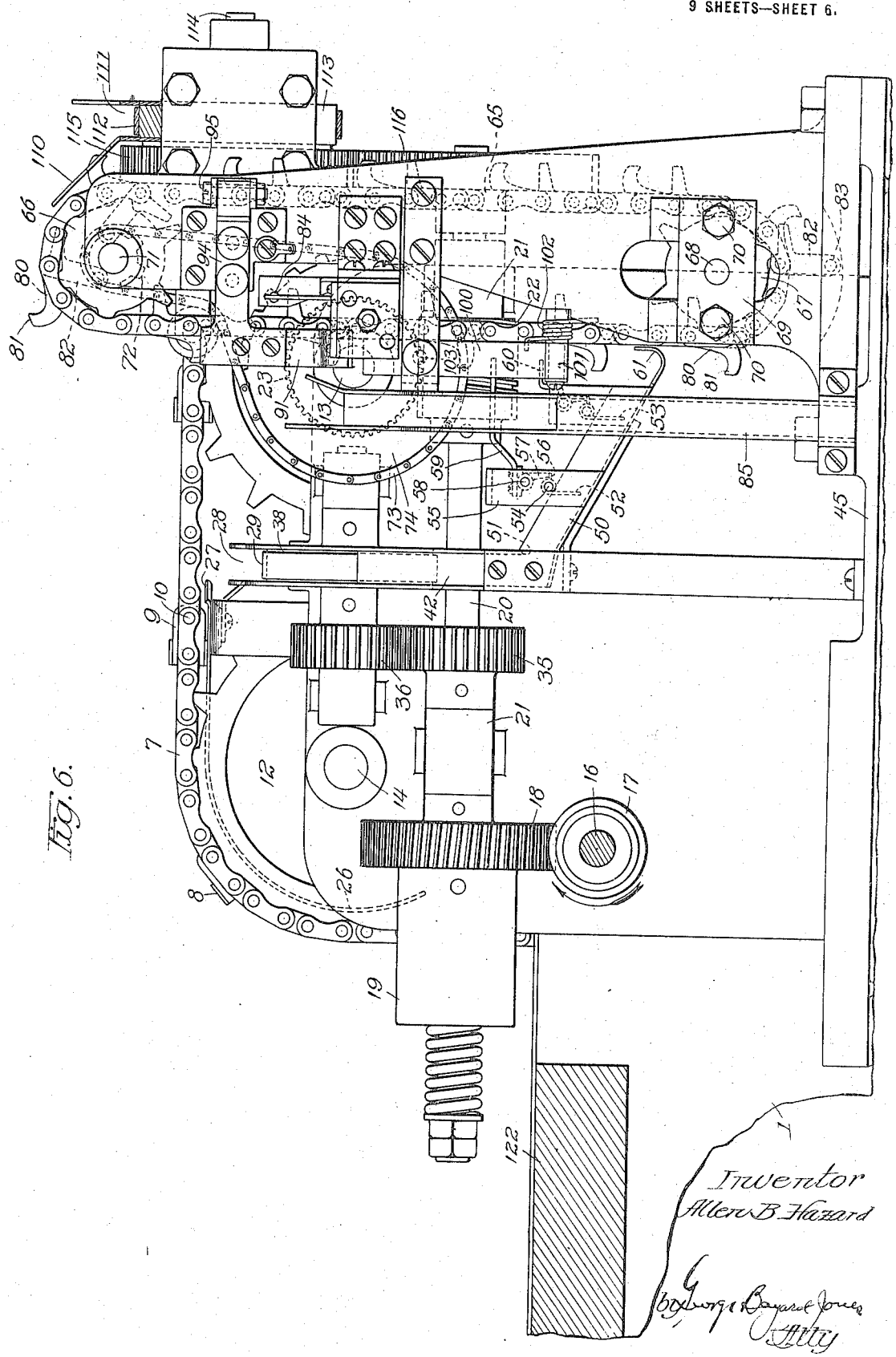

A. B. HAZARD.
TESTING PROCESS AND MACHINE.
APPLICATION FILED SEPT. 1, 1915.
1,254,690.
Patented Jan. 29, 1918.
9 SHEETS—SHEET 7.
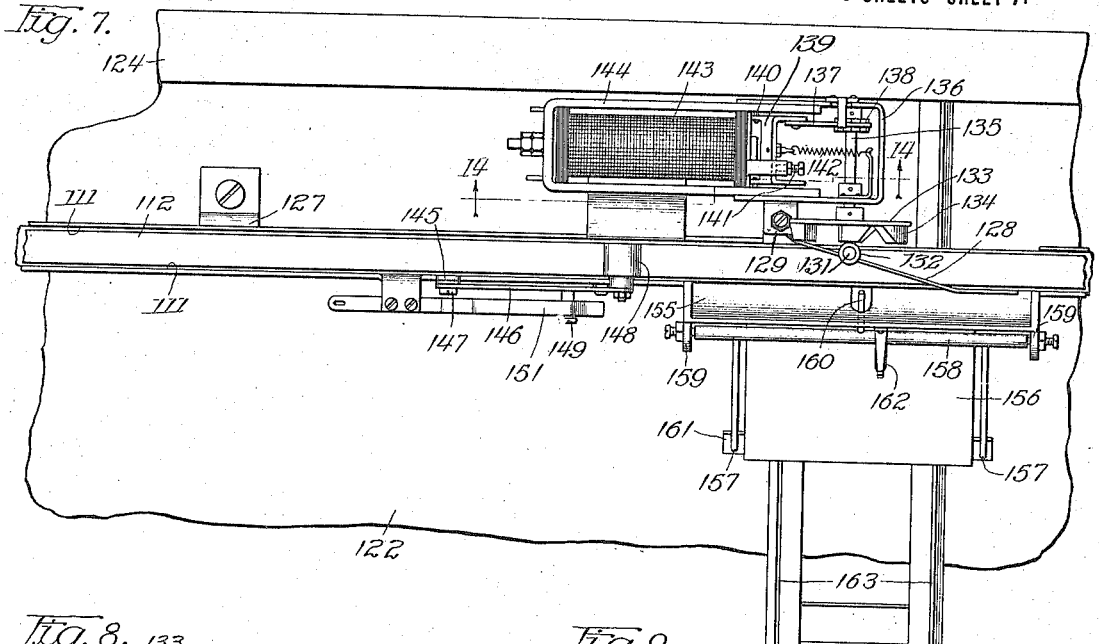
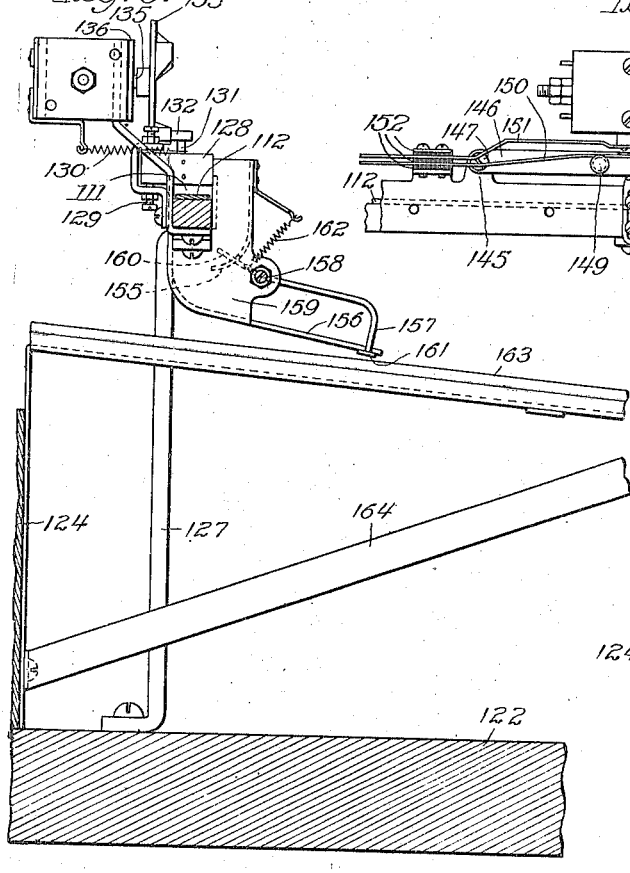
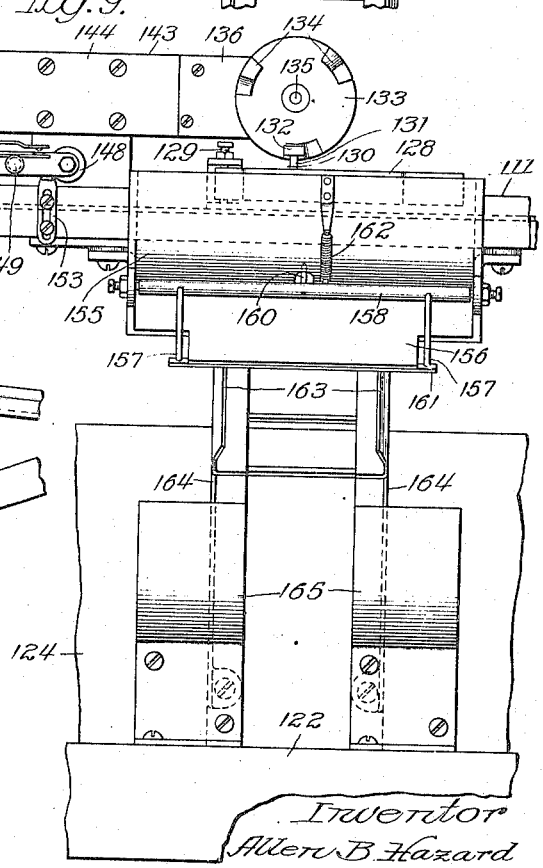
Inventor
Allen B. Hazard
by George Bayard Jones
Atty A. B. HAZARD.
TESTING PROCESS AND MACHINE.
APPLICATION FILED SEPT. 1, 1915.
1,254,690.
Patented Jan. 29, 1918.
9 SHEETS—SHEET 8.
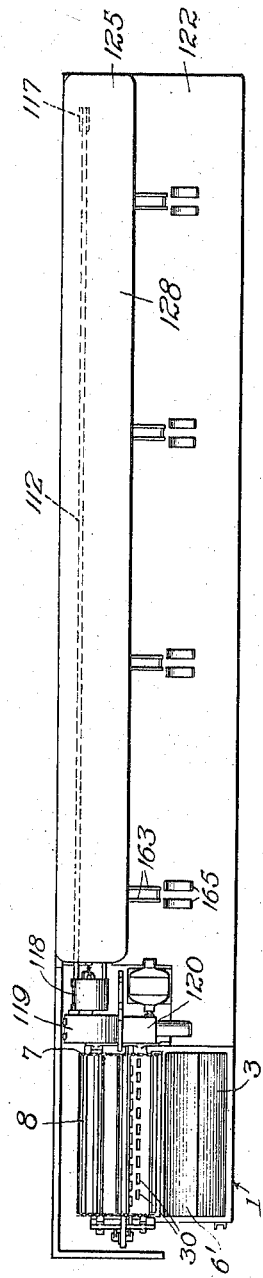
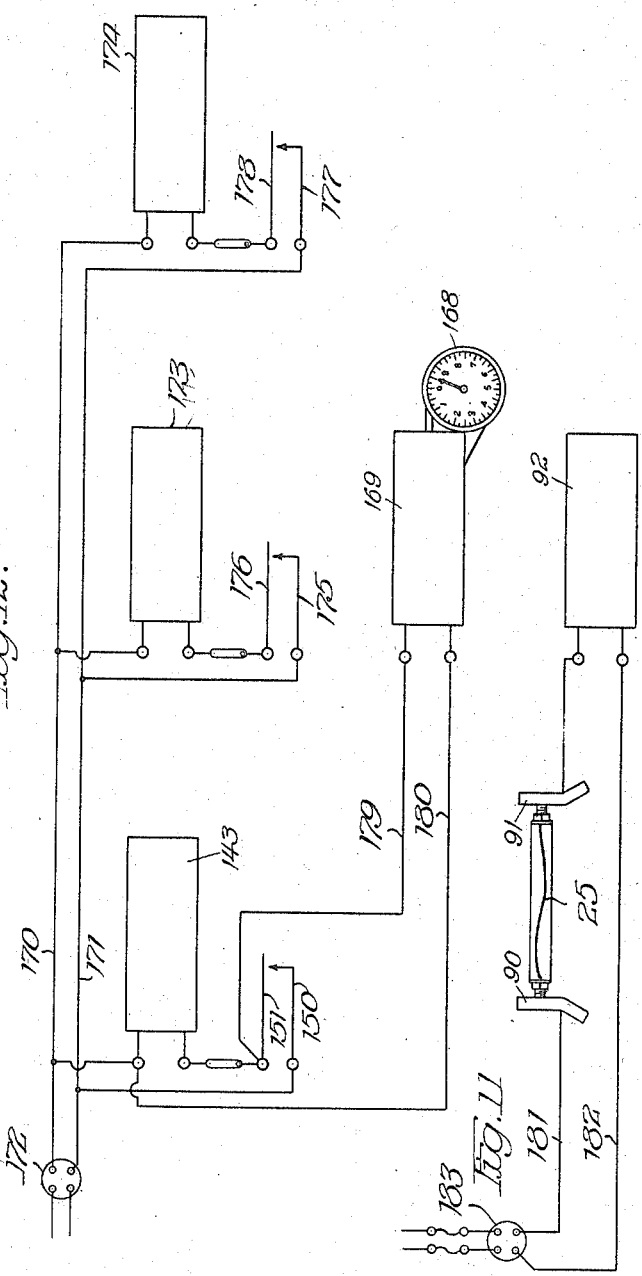
Inventor
Allen B. Hazard
by George Bayard Jones
Atty

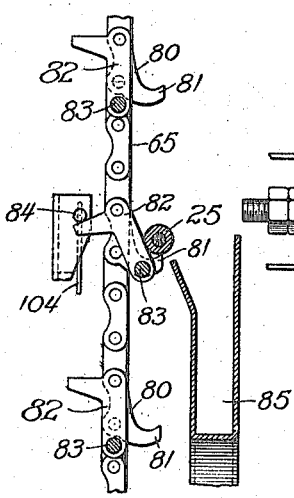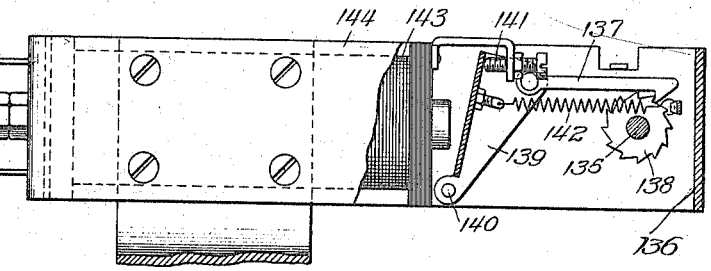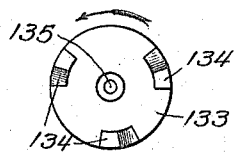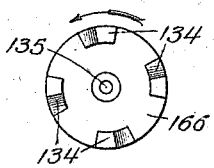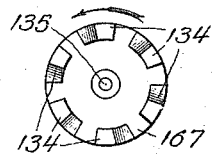

UNITED STATES PATENT OFFICE.

ALLEN B. HAZARD, OF BERWYN, ILLINOIS, ASSIGNOR, BY MESNE ASSIGNMENTS, TO WESTERN ELECTRIC COMPANY, INCORPORATED, A CORPORATION OF NEW YORK.

TESTING PROCESS AND MACHINE.

1,254,690.                  Specification of Letters Patent.       Patented Jan. 29, 1918.

Application filed September 1, 1915. Serial No. 48,513.

*To all whom it may concern:*

Be it known that I, ALLEN B. HAZARD, a citizen of the United States, residing at Berwyn, in the county of Cook and State of Illinois, have invented certain new and useful Improvements in Testing Processes and Machines, of which the following is a full, clear, concise, and exact description.

This invention relates both to a process of testing the conductivity and dimensions of objects, and to improvements in testing machines.

The embodiment of the invention herein illustrated and described is a process and machine for automatically testing fuse cartridges to determine whether the circuit through the fusible element is intact and whether the fuse is of the proper length. The invention is not limited in its application, however, to the testing of fuses, as other embodiments thereof are contemplated for testing other articles both as to physical dimensions and electrical conductivity, as well as in other ways.

The more important objects of the invention are: to provide a process and means for automatically testing objects as to their dimensions and conductivity; to provide means for automatically separating those which do not fulfil the requirements from those which do; to provide means for automatically taking the objects to be tested from a receptacle into which they have been introduced promiscuously, presenting them to the testing apparatus continuously and in proper relation thereto; and rejecting those which do not pass the test; to provide a fuse cartridge testing machine which automatically tests the continuity of the circuit from one terminal to the other and which also tests for minimum length, separating the good fuses from the bad; to provide means for supplying fuses to be tested in regular order and substantially continuously, whereby the testing apparatus may be operated at maximum capacity; to provide electromagnetically operated ejecting means controlled by the circuit established momentarily through the fuses as they are being tested; and to provide means for distributing the perfect fuses in equal numbers to a plurality of points.

The mechanism for separating the articles to be tested, removing them from the hopper, conveying them to the testing apparatus and subsequently distributing the perfect fuses, is claimed in my co-pending application, Serial No. 200,916, filed November 8, 1917, "Conveying mechanism."

In the accompanying drawings, in which an embodiment of the invention is illustrated:

Fig. 4 is a front elevation of the testing mechanism, and associated parts.

Fig. 5 is a top plan view thereof.

Fig. 6 is a side elevation thereof.

Fig. 7 is a top plan view of part of the distributing mechanism.

Fig. 8 is a side elevation thereof, parts being shown in section.

Fig. 9 is a front elevation thereof.

Fig. 10 is a top plan view of the entire distributing mechanism.

Fig. 11 is a diagram of the testing circuit.

Fig. 12 is a diagram of the distributing mechanism circuit.

Fig. 13 is a section on the line 13—13 of Fig. 4.

Fig. 14 is an enlarged elevation partly in section of a portion of the distributing mechanism, as seen on line 14—14 of Fig. 7.

Figs. 15, 16 and 17 are views of the three distributer cam disks.

The machine, in the form illustrated, may be considered as consisting of three parts. First, the means for presenting the fuses to the testing mechanism in regular order. Second, the testing mechanism *per se*, and third, the distributing mechanism.

Figure 3:
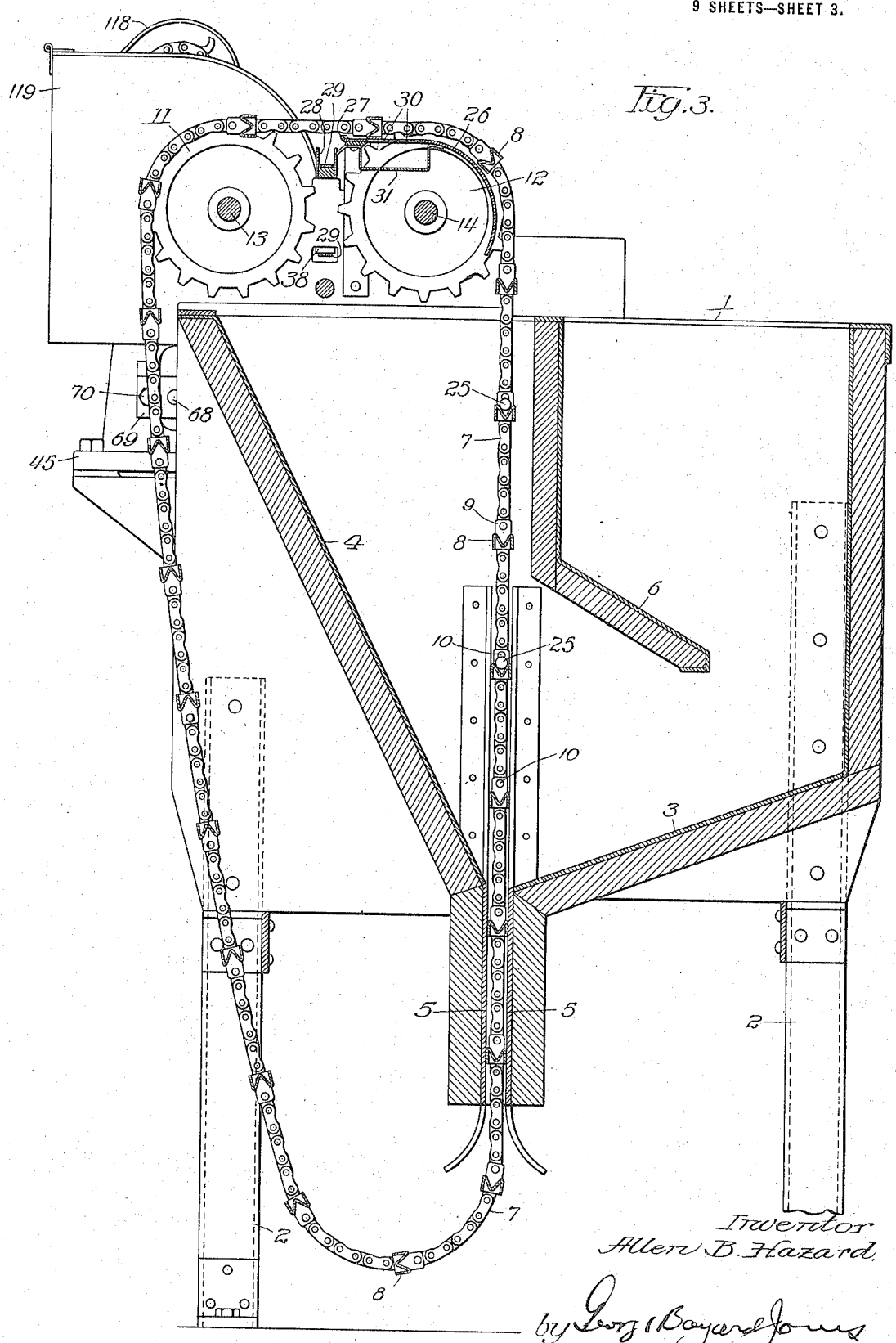
Fig. 3 is an enlarged section on the line 3—3 of Fig. 1.

The first mentioned mechanism consists primarily of a hopper from which the fuses are lifted by means of the buckets of an endless chain conveyer, delivered onto an endless feed belt and carried to the magazine of the fuse testing mechanism. The hopper 1 has a capacity of about four thousand fuses. It is made preferably of wood lined with sheet iron and is supported on suitable standards or legs 2, preferably in the form of channel irons. The bottom of the hopper 3 is sloping, as shown in Fig. 3, and the rear wall 4 thereof is inclined somewhat from the vertical, said bottom and rear walls being extended downwardly, as shown at 5, 5 to form a narrow vertical passageway having a flaring opening at its lower end. An inclined deflector 6 is provided, hereinafter described. A pair of endless chains 7 are arranged in said passageway and are connected by a plurality of troughs or buckets 8 made of sheet metal and resembling in cross-section the letter M. They are secured at opposite ends to blocks 9 carried by the chains 7 by means of extended rivets or pins 10. The endless conveyer thus formed is supported on two pairs of sprocket wheels 11, 12, the rear wheels 11 being mounted on the driving shaft 13, and the forward wheels 12 being mounted on an idler shaft 14.

The conveyer may be driven by any suitable source of power, such for example, as an electric motor 15 which carries on its armature shaft 16, a worm 17 meshing with the gear 18. An inclosed friction drive and clutch 19 is associated with said gear and drives a shaft 20 mounted in suitable brackets 21. The friction drive may be of any suitable standard construction and need not be described herein.

The shaft 20 extends from the front to the rear of the machine, as shown in Fig. 5, and near the end thereof carries a worm 22 which meshes with the gear 23 directly above it, said gear being mounted on the shaft 13 whereby the conveyer is driven by the motor through the various gears just described.

The fuses to be tested are simply dumped into the hopper, into which they fall in great disorder although they tend to arrange themselves parallel to the buckets 8, a certain percentage of them rolling into said buckets as the latter ascend through the mass of fuses. A fuse 25 is shown in one of the buckets in Fig. 3. Each bucket is long enough to accommodate about five fuses end to end, but owing to the irregular arrangement of the fuses in the hopper, the buckets, as they ascend, may contain from 1 to 5 fuses in proper alinement. They may contain one or more additional fuses resting on top of those which are properly located in the buckets, such additional fuses falling off, however, subsequently as hereinafter explained.

The sloping bottom wall 3 of the hopper, and the inclined rear wall 4 thereof, are set at such angles as to prevent the mass of fuses from becoming too deep at the point where the buckets rise through them. The deflector 6 contributes to this result by directing the fuses to the front as they are dumped into the hopper and taking the weight of the superimposed fuses from the lowermost part of the hopper where said weight would tend to be concentrated. Otherwise, the weight of the mass would be so great as to distort said buckets. The chains hang freely from the two sets of sprockets, as shown in Fig. 3, except that one side is guided in its upward movement.

Figure 2:
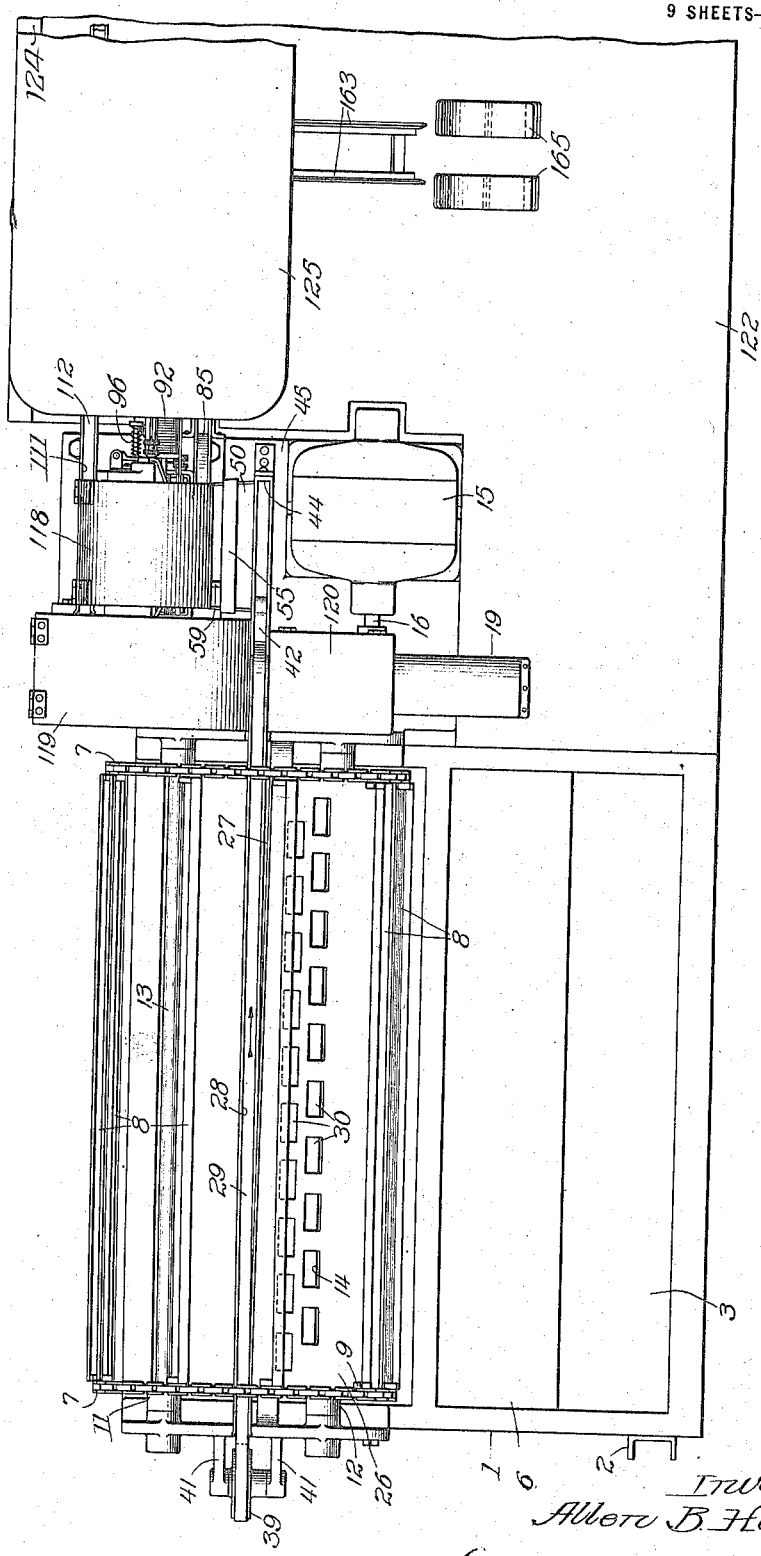
Fig. 2 is a top plan view thereof.

Directly beneath the conveyer, where the chains begin to bend around their sprocket wheels and assume a horizontal position, at the upper portion of their travel, a sheet metal apron 26 is provided, see Figs. 2 and 3. The edge of said apron is not exactly at right angles to the direction of travel of the conveyer, but is inclined very slightly with respect thereto, as shown in said figures. At its rear it is turned upward slightly to form a lip 27. As the chains bend around the sprockets and begin their horizontal travel, the buckets are turned on one side, and the fuses in each bucket roll out more or less in advance of said bucket, and mainly parallel thereto, and are pushed over said lip by said buckets, whereby they fall into the channel 28 onto the endless belt 29, which belt conveys them in the direction shown by the arrow in Fig. 2. Such fuses as do not happen to be approximately parallel to the lip 27 as they are rolled toward it along the apron 26, are restrained momentarily at one end or the other by said lip, whereby they are pushed around parallel to it by the buckets as they are crowded over said lip onto said belt. Since said lip is not exactly parallel to said belt, the fuses at the righthand side of the apron drop onto the belt slightly before those at the lefthand side thereof, whereby said fuses are spaced apart more than they would otherwise be, thus preventing one crowding the other when they reach the magazine. The apron 26 has a plurality of openings 30 therein arranged preferably in two rows, the openings in one row being staggered with respect to the other row. It sometimes happens that extra nuts, such as are used on the screw-threaded terminals at the ends of said fuses, are found in the hopper. Such loose parts and other foreign objects drop through said openings and fall into tray 31, whereby they are prevented from reaching the traveling belt 29 and being conveyed to the main portion of the testing machine.

The means for driving the belt 29 will now be described. The shaft 20, is driven by the electric motor through suitable gearing previously described, and is provided with a gear 35 which meshes with the gear 36 immediately above it, the latter gear being fixed to the shaft 37 to which is also fixed the pulley 38. The belt 29 passes over said pulley 38, and also over a second pulley 39 at the opposite end thereof, the latter pulley being mounted on a shaft 40 carried in suitable bearings 41.

The fuses are carried along by the belt 29 to the magazine, to reach which they slide down a chute 42 consisting of bottom and side walls, the bottom wall beginning in an incline (as shown in Fig. 4) and ending in a horizontal portion, a hump or projection 43 being provided near the base of the incline which causes the forward end of each fuse to kick outwardly and fall flat on the horizontal portion at the same time striking a stop plate 44, but without rebounding, said projection 43 acting as a second stop for the rear ends.

The function of the apparatus thus far described is to feed the fuses to the testing part of the machine, previously referred to as the "testing machine *per se*," with as much regularity as possible, and with the fuses following each other in quick succession, but not piled up one on top of the other. It is immaterial, however, which end of the fuses is presented first.

The testing apparatus is mounted on a suitable table or shelf 45. It consists, generally speaking, of a magazine in the form of an inclined guide on which the fuses are stored and down which they roll to an endless chain or conveyer, by means of which the fuses are carried between yielding contact members over both of which each fuse slides, closing a circuit, testing the continuity of the fusible element and testing the fuse cartridge as a whole at the same time for minimum length. Such fuses as pass the test are dropped onto a second conveyer which carries them to the third or distributing part of the machine. The fuses which do not pass the test are ejected and guided to a separate compartment or receptacle, the ejector being controlled by the above mentioned testing circuit.

The fuses, after striking the end 44 of the channel 42 roll down the magazine 50, passing through a suitable opening 51 in one of the side walls of the channel. Their downward passage is obstructed by two gates 52, 53. The gate 52 consists of a strip of sheet metal having ears wrapped around the rod 54, which latter is pivotally supported in a frame 55. One of said ears is struck up to form a projection or stop 56. The gate is locked against rotation by means of an arm 57 which normally engages the stop 56, said arm being secured to a shaft 58 also mounted in the frame 55 and having a tripping arm 59 extending therefrom which is tripped periodically by the conveyer chain in a manner hereinafter described. The second gate 53 is similarly mounted and controlled and is tripped at intervals by a second arm 60. These two gates have a double function. First, they cause the fuses to remain always parallel to each other and to the end of the incline, whereas otherwise one end might roll down ahead of the other owing to the slightly increased diameter of the nut at one end. Second, they prevent a fuse from rolling down to the seat 61 at the end of the magazine just as the conveyer belt is about to lift one from said seat. The gates are so arranged that they do not open simultaneously, but at equal intervals apart, although both gates are held open by the fuse when the magazine is full.

The test conveyer consists of a pair of chains 65 passing over the upper and lower pairs of sprocket wheels 66, 67. The lower sprockets are mounted on a shaft 68, mounted in blocks 69, and held in position by bolts 70. The upper sprockets 66 are mounted on a shaft 71 provided at one end with an additional sprocket wheel 72, which is driven by a chain 73 from a larger sprocket wheel 74 mounted on the same driving shaft 13 which drives the first conveyer described. Every second complete link of the chain 65 (see Fig. 13) has the form of an elongated plate 80 terminating in a hook 81. These hooks are adapted to lift the fuses one at a time from the seat 61 of the magazine and carry them upward between two testing plates with which the ends of said fuses may contact momentarily and close a circuit, if the fuse is intact. An ejector mechanism is provided for such fuses as do not pass the test. Such mechanism will now be described.

Adjacent to each of the plates 80 a bell crank lever 82 is pivotally mounted. The long arms of each of the corresponding levers on the two chains are connected by a rod 83 whereby said levers may swing about their pivots as a unitary structure. The short arms of said levers project rearwardly on the ascending side of the chain and are adapted, normally, to be engaged by a pin or stop 84. This pin, unless withdrawn, obstructs said bell crank levers, causing them to rock about their pivots, whereupon the long arms thereof push the fuses out of the hooks 81 from which they drop down a chute 85 into a suitable receptacle located beneath the apparatus. Said pin, however, is withdrawn whenever a perfect fuse passes, whereby the fuse is not ejected, but is delivered to a traveling belt hereinafter described, which carries it to the distributing mechanism.

The testing apparatus will now be described. It consists primarily of a pair of contact plates 90, 91 included in a circuit with an electromagnet 92 whereby, when said contacts are bridged by a fuse, said electromagnet is energized. The contact 90 is mounted on a fixed support 93, whereas the contact 91 is carried by a yielding support 94 rotatably mounted about the pivot 95. A compression spring 96 permits contact plate 91 to yield when a fuse passes. Forward movement of said contact plate is limited by a set screw 97 which abuts against a part of the frame. This set screw also permits adjustment for fuses of different lengths. The fuses, as they are being carried upward by the chain, are positioned laterally with respect to said chain by means of converging arms 100, pivotally supported on shoulder screws 101 and yieldingly held by springs 102 against adjustable stops 103. The lower ends of the test plates 90, 91 are bent apart as a further aid in guiding the fuses between said plates. If the fuse is too short, the circuit of electromagnet 92 will not be closed, whereupon the rod 84 remains projected forward in normal position and the fuse is ejected. If the fuse is of the required length, and if the fuse circuit is intact, contacts 90, 91 will be bridged and the energization of the electromagnet 92 will cause the attraction of its armature 104, thereby swinging said armature about its pivot 105 against the action of the spring 106, thus withdrawing the rod 84 from the path of the bell crank levers by virtue of a pin connection 107 carried by said rod and a slot in the armature within which said pin is loosely received. Outward movement of the armature is limited by an adjustable stop 108.

Figure 1:
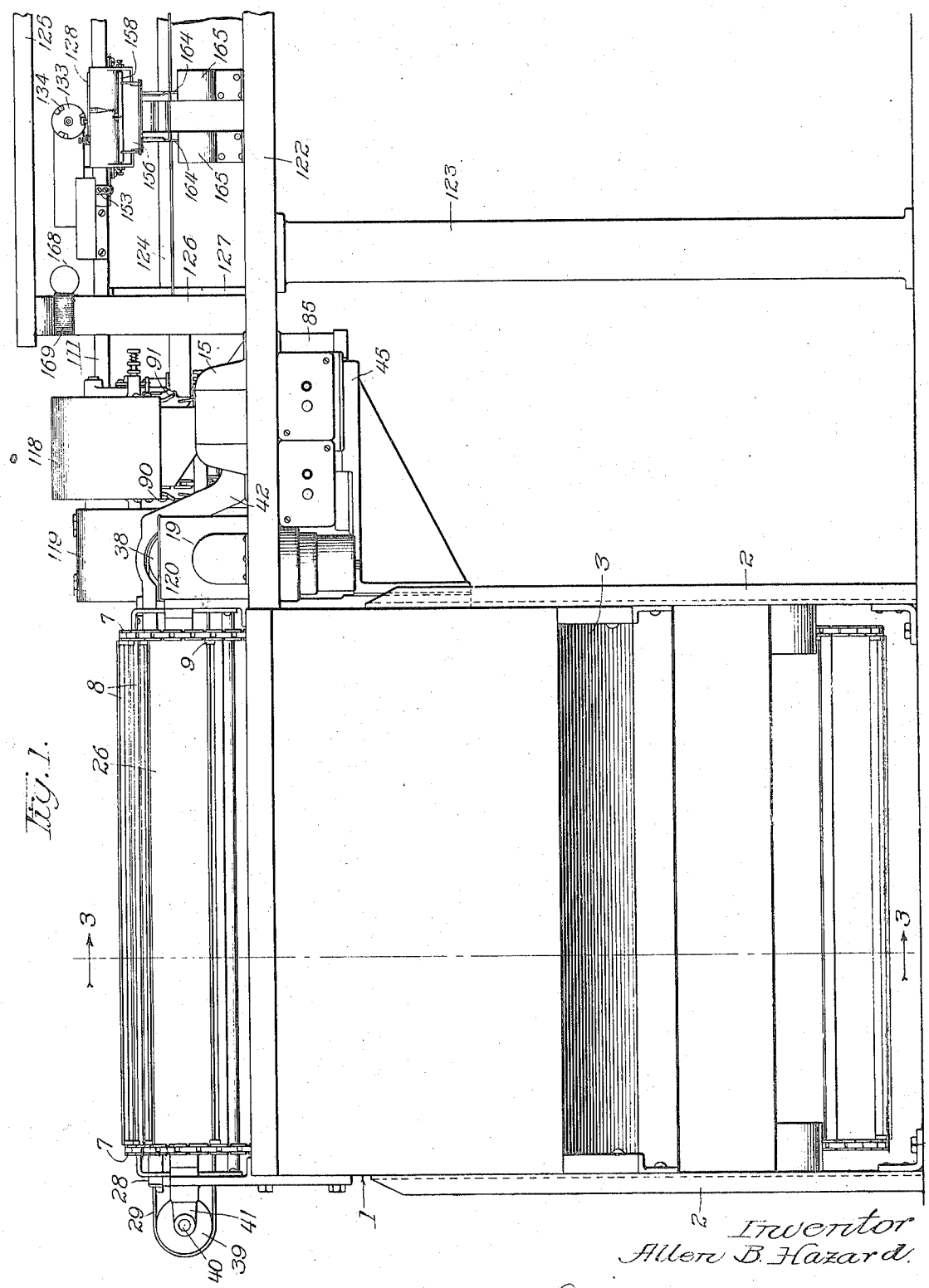
Figure 1 is an elevation of one part of the machine.

The good fuses are carried around the upper sprocket wheels 66 by the conveyer and roll down the guide plate 110 into the channel 111 onto a distributer belt 112. Said belt passes over a pulley 113 at one end (see Fig. 5), which pulley is mounted on a short shaft 114 carrying also a gear 115 which meshes with a gear 116 directly beneath it and mounted on the shaft 20. The other end of said belt passes over a second pulley 117 (see Fig. 10). The fuses are carried along this belt to the distributing mechanism hereinafter described. The testing mechanism is covered and protected by a suitable sheet metal hood 118, seen in Figs. 1 and 2. Other hoods 119, 120 are also provided to cover different parts of the gearing.

The distributer mechanism constitutes the third part of the machine previously mentioned and is mounted on a bench or table 122, preferably made of wood and supported by a plurality of metal legs 123. A vertical board or backing 124 is provided at the rear. A shelf 125 is also preferably provided above the bench and is supported by suitable uprights 126.

The channel 111, within which the distributer belt 112 travels, is elevated above the table on a plurality of supports or brackets 127. The bench is long enough to permit several operators to stand or be seated side by side to inspect and pack the fuses delivered to them from the belt. In the present instance, provision is made for four operators, although the number may be varied.

Mechanism is provided to throw off the fuses at four different points as they travel along the belt whereby they may roll down to a point within easy reach of each operator. In order to supply each operator with the same number of fuses to inspect and pack, the following mechanism is provided.

At each of the four points where it is desired to roll the fuses off the belt, a deflector 128 is provided, the latter being pivotally mounted on a pin 129 and arranged to be moved to the position shown in Fig. 7 whereby any fuse that strikes it is crowded off the belt and rolls down an incline hereinafter described. However, each deflector is normally withdrawn from the path of the fuses by a spring 130 which engages a pin 131 on the deflector, said pin carrying a roller 132. Only one out of every four fuses which reaches the first deflector is thrown off and rolled down to the operator, whereas it is necessary to throw off one out of every three fuses which reaches the second deflector. Similarly, one out of every two fuses which reaches the third deflector must be thrown off the belt, and all of the fuses which reaches the fourth deflector must be thrown off. This arrangement insures an exactly uniform distribution of fuses to each of the operators where four are employed. Where a different number of operators are employed, a readjustment or slightly different order for ejecting said fuses must, of course, be employed.

The mechanism for projecting the first deflector consists of a rotary disk 133 having three projections or cams 134 thereon, arranged to engage the roller 132. Said disk is mounted on a shaft 135 mounted in a suitable frame 136 and rotated by a pawl and ratchet mechanism 137, 138. The ratchet has twelve teeth in the construction shown. The pawl is operated by an armature 139 which is pivoted at the point 140, said armature being normally held against an adjustable stop 141 by means of a spring 142. It is attracted, however, by an electromagnet 143 supported by a suitable frame 144. Whenever the magnet is energized, the ratchet is rotated one tooth, corresponding to one-twelfth of a revolution, and since there are three cams on the disk 133, every fourth energization of the electromagnet results in swinging the deflector 128 about its pivot 129 against the action of the spring 130, whereupon the deflector projects across the path of the passing fuse.

The circuit of the electromagnet is normally open but is controlled by the passing of the fuses. The side wall of the channel 111 is extended at a point adjacent to the deflector to form a supporting plate 145 to which a lever 146 is pivoted at the point 147. Said lever carries a roller 148 at its free end, which roller is adapted to be raised by every passing fuse, thereby causing a projecting stud 149 carried by said lever to raise the lower spring contact 150 against the upper spring contact 151, thereby closing the circuit of the electromagnet. Said contacts are mounted between suitable insulating blocks 152 and are connected in the circuit illustrated diagrammatically in Fig. 12 hereinafter described. Every time a fuse passes, the electromagnet is energized, as previously explained, whereby every fourth fuse is crowded off the belt by the deflector. An adjustable stop 153 is provided which determines the lowermost position of the roller 148.

The fuses thrown off by the deflector (see Fig. 8) first strike a sheet metal guide 155 from which they drop on to and roll down a sheet metal incline 156, at the end of which they are obstructed by the bent ends of a pair of guard rods 157, the latter being pivotally mounted on a supporting shaft 158 supported in the side walls 159 of the receptacle of which the incline 156 forms the bottom. A rearwardly projecting arm 160 is also mounted on the shaft 158 and projects through a suitable opening in the guide 155, whereby the guard wires 157 are tripped or raised momentarily whenever a fuse falls from the distributer belt. The ends of the guard wires 157 normally rest on a cross-bar 161 against which they are held by the action of the spring 162. It will be seen that the fuses are obstructed by the guard wires 157 but are released one at a time, each fuse so obstructed being released by the succeeding fuse as it falls off the belt.

The fuses thus released roll down a pair of rails 163 made of sheet metal and supported at the rear ends on the board, 124 at the rear of the bench. Said rails are braced by diagonal braces 164. At the forward ends, they terminate adjacent to a pair of semi-circular receptacles 165 which catch the fuses that roll down the incline and from which the operator may conveniently lift them, in view of the fact that said receptacles are spaced apart enough to enable the operator to grasp the fuses by the middle.

The mechanism for operating the second and third deflectors is substantially identical with the mechanism just described, with the exception of the number of cams on the disk 133 and, therefore, will not be described in detail. The succeeding disks 166 and 167 (see Figs. 16 and 17) are provided with four and six cams respectively instead of three. The one having four cams, therefore, throws off every third fuse and the one having six cams throws off every second fuse. The last deflector is always in position and throws off every fuse.

A counter 168 is provided for counting all the good fuses; that is, the ones which pass the first roller. It is operated by an electromagnet 169 (Fig. 12), arranged in parallel with the electromagnet 143 and energized every time a fuse passes. In the diagram, the circuit to the mains 170, 171 is closed by a suitable switch 172. The electromagnets 143, 173, 174, which actuate the deflectors, previously described, are connected across the circuit in parallel with each other. The circuit to the electromagnet 143 is closed by the resilient contacts 150, 151 previously described. A similar pair of contacts 175, 176 closes the circuit to the electromagnet 173, and a third pair 177, 178 closes the circuit to the electromagnet 174. The electromagnet 169 for operating the counter is connected in parallel with the electromagnet 143, as previously stated, but is in series with the contacts 150, 151, whereby the closing of the said contacts energizes both electromagnets. The counter is indicated only diagrammatically, and may be of any suitable type. It is obvious that where the number of operators employed is to be increased or decreased, the number of electromagnets may be varied accordingly. The circuit diagram shown in Fig. 11 will be readily understood in view of the preceding description. The circuit to the electromagnet 92 is established through the conductors 181, 182 connected with a suitable switch 183. The circuit is closed by the fuse 25 which bridges contact elements 90, 91.

Therefore, fuses used in telephone circuits, for example, have been tested by operators who draw the fuse between two contact springs connected in a buzzer circuit. This method was not only comparatively slow and tedious, but was open to the additional objection of requiring a test by sound, with the possibility of an operator passing a defective fuse. With the present machine, not only is the testing effected much more rapidly, but with unfailing accuracy. It is therefore, more reliable, as well as more economical, as the services of several operators are dispensed with. The machine operates at substantially maximum capacity, owing to the fact that several fuses are usually stored in the magazine, thus insuring a uniform feeding thereof to the testing mechanism, regardless of slight irregularities in the number of fuses picked up by the conveyer from time to time.

The invention is not limited to the particular embodiment thereof, herein described in detail, as various changes may be made therein. Furthermore, various other embodiments of the invention may be devised applicable to the testing of articles other than fuse cartridges.

What is claimed is:

1. In a testing machine, a pair of contact elements, means for passing the articles to be tested between said elements, and selecting mechanism controlled by the coöperation of said articles with said contact elements.

2. In a testing machine, a pair of contact elements constituting circuit terminals, a conveyer for passing the articles to be tested between said elements to bridge the latter and close a circuit, and ejecting mechanism controlled by the closing of said circuit for ejecting articles whose conductivity is less than required.

3. In a testing machine, a pair of contact elements one of which is yieldingly mounted, means for establishing a minimum distance between said elements, a conveyer for passing the articles to be tested between said elements in contact with both of them, and ejecting means electrically controlled by the closing of a circuit through said contact elements by said articles, whereby said articles are tested both for continuity and for minimum dimensions.

4. In a fuse testing machine, a hopper, a magazine, means for carrying fuses from said hopper to said magazine, testing mechanism, means for carrying said fuses in regular order from said magazine to said testing mechanism, means for discarding imperfect fuses, and means for distributing perfect fuses in equal numbers to a plurality of different points.

5. The combination with a belt conveyer, of a channel adjacent to one end thereof, said channel having an inclined portion, and a horizontal portion with stops at both ends of the latter portion.

6. The combination with a channel, of a belt conveyer moving therethrough, an inclined guide at one end of said conveyer, a projection near the base of said incline, and a horizontal support beyond said projection having a stop at the end thereof.

7. In a testing machine for cylindrical objects, a magazine consisting of an inclined guide-way having a seat at the lower end, and having a gate at an intermediate portion for permitting said objects to roll down to said seat, one at a time.

8. In a testing machine, the combination with an inclined magazine having a seat at its lower end, of a plurality of gates, and means for actuating said gates, one after the other.

9. In a machine for testing cylindrical objects, a gate consisting of a pivoted partition, a pivoted stop for locking said gate, and means for periodically rendering said stop inoperative.

10. In a machine for testing cylindrical objects, a gate consisting of a pivoted partition, a pivoted stop for locking said gate, a tripping arm and a testing conveyer for periodically engaging the latter to unlock said gate.

11. In a testing machine, a testing conveyer provided with hooks, a seat for the article to be tested arranged so that a pair of hooks passes on opposite sides thereof, lifting therefrom by its opposite ends the article to be tested, and a pair of testing elements between which said article is carried by said hooks.

12. In a testing machine, the combination with a testing conveyer for lifting the objects to be tested one at a time, of a pair of test plates between which said objects are carried, means arranged normally to eject said objects from said conveyer, and means controlled by the coöperation of said objects with said test plates for rendering said ejecting means inoperative.

13. In a testing machine, a magazine for storing a plurality of articles to be tested, a pair of test plates, a conveyer for lifting the articles to be tested one at a time between said test plates, means for ejecting said articles from said conveyer after they pass said plates, and electromagnetic means controlled by the closing of a circuit through said test plates and said articles for rendering said ejecting means inoperative.

14. In a testing machine, the combination with a magazine, of a pair of testing members adapted to be bridged by the articles to be tested, a conveyer for causing said bridging, and guide members for alining said articles with respect to said testing members.

15. In a testing machine, a conveyer consisting of a pair of chains, certain of the links of which are elongated to provide hooks, a plurality of bell crank levers pivotally carried by said chains and cross-bars secured at opposite ends to a pair of said levers.

16. In a device of the class described, a pair of sprocket wheels, a chain conveyer passing thereover, electrical testing contacts arranged near one side of said conveyer, a chute adjacent thereto, and distributing means arranged on the other side of said conveyer.

17. In a device of the class described, contact blocks, a conveyer passing between said blocks, a chute adjacent to said blocks for receiving rejected fuses, and a distributing mechanism adjacent to said conveyer for receiving good fuses.

18. In a device of the class described, a pair of electrical contact plates having substantially parallel testing surfaces, one of said plates being rigidly mounted, the other of said plates being pivotally mounted, a spring impelling said latter plate toward said first plate, an adjustable stop for limiting the distance between said plates, and a test circuit of which said plates constitute a part.

19. In a device of the class described, an ejector pin an electromagnet, a pivoted armature therefor, said armature being connected with said pin to withdraw it, and a pair of substantially parallel contact plates arranged to close the circuit to said electromagnet when bridged.

20. The process of testing the conductivity of articles, which consists in arranging said articles in the same order, passing them one at a time between a pair of contacts to energize an electromagnet and separating them into two grades, dependent upon the energization of said magnet.

21. The process of testing fuse cartridges for length and continuity of circuit, which consists in automatically passing said cartridges between a pair of contacts arranged at a predetermined distance and dividing said fuses into two groups, depending on whether or not they complete the circuit between said contacts.

22. The process of testing fuse cartridges which consists in arranging them in a row, passing them one at a time between testing contacts, ejecting those which fail to complete a circuit therethrough, and distributing the balance to a plurality of points in equal numbers.

In witness whereof, I hereunto subscribe my name this 23d day of August, A. D. 1915.

ALLEN B. HAZARD.